(12) United States Patent
Yang

(10) Patent No.: US 8,117,515 B2
(45) Date of Patent: Feb. 14, 2012

(54) METHODOLOGY AND APPARATUS FOR SOFT-INFORMATION DETECTION AND LDPC DECODING ON AN ISI CHANNEL

(76) Inventor: Sizhen Yang, Irvine, CA (US)

( * ) Notice: Subject to any disclaimer, the term of this patent is extended or adjusted under 35 U.S.C. 154(b) by 1362 days.

(21) Appl. No.: 11/728,132

(22) Filed: Mar. 23, 2007

(65) Prior Publication Data
US 2008/0235561 A1    Sep. 25, 2008

(51) Int. Cl.
*H03M 13/00* (2006.01)
(52) U.S. Cl. ........ 714/755; 714/786; 714/788; 714/780; 714/762
(58) Field of Classification Search ............. 714/755, 714/786, 788, 762
See application file for complete search history.

(56) References Cited

U.S. PATENT DOCUMENTS
2009/0019332 A1 *  1/2009  Hekstra et al. ................ 714/752
* cited by examiner

*Primary Examiner* — Guy Lamarre

(57) ABSTRACT

A system comprising a plurality of channel detectors (CDs) receiving quantized and equalized ISI channel information indicative of an LDPC codeword. The channel information is split for input to the CDs, such that each CD receives channel information indicative of a portion of the LDPC codeword. Each CD outputs at least first soft information for bits of the codeword portion of that CD. The first soft information for the codeword is received by an LDPC decoder, which uses the soft information to produce a user bit sequence and second soft information about the user bit sequence. The system can cause the second soft information to be input to the plurality of CDs, such that iterative processing can occur for the codeword. Other aspects include a system providing clocking of one or more CDs at a frequency selected to balance codeword throughput of the CDs with codeword throughput of an LDPC decoder clocked by a second clock, and methods according to each system.

21 Claims, 13 Drawing Sheets

METHODOLOGY AND APPARATUS FOR SOFT-INFORMATION DETECTION AND LDPC DECODING ON AN ISI CHANNEL

BACKGROUND

1. Field

The following pertains to the fields of information storage and transfer, and more particularly to the field of retrieving information from an inter-symbol interference (ISI) channel.

2. Description of Related Art

A "channel" is a term for a model of any system that conveys information through space and/or time, e.g., storage media and communication systems can be modeled as channels.

An ISI channel refers to a type of distortion channel. Distortion refers to temporal spreading and consequent overlap of individual pulses to the degree that a receiver cannot reliably distinguish between individual signal elements. For example, a partial response magnetic recording channel is an ISI channel. The wireless fading channel, usually modeled as a tapped-delay-line is also an ISI channel.

Every channel has a capacity. As long as the transmission rate is less than the channel capacity, it is possible to obtain a low-error rate system through the use of certain error correction codes. LDPC codes are known examples of good performance error correction that allow transmission rates close to channel capacity at achievable signal-to-noise ratios (SNR).

LDPC codes are linear block codes that have parity check matrixes with a small number of nonzero elements in each row and column. LDPC codes can be constructed over any Galois Field. For example, a binary LDPC code is defined over GF(2), in which "1" is the only nonzero element. Since LDPC codes are block codes, it is necessary to receive a whole codeword before the LDPC decoding process can begin.

LDPC decoders use soft information during decoding. Soft information can be generated by a soft information detector, such as the Soft Output Viterbi Algorithm (SOVA) or the Bahl Cocke Jelinek Raviv (BCJR) algorithm.

Decoders for ISI channels can use a soft information detector followed by an LDPC decoder in an iterative fashion. As data rates and/or densities continue to increase, LDPC decoders should perform well in lower signal to noise (SNR) situations.

SUMMARY

According to one aspect, a receiver for an intersymbol interference (ISI) channel comprises a plurality of channel detectors (CDs). Each CD is operable to receive information indicative of a portion of a codeword signaled on the channel and to output bit decisions and first soft information for each bit decision of its codeword portion. The decoder also comprises a low density parity check (LDPC) code decoder operable to input the bit decisions and the first soft information from the plurality of CDs, the LDPC decoder operable to output user bits for the codeword and second soft information relating to accuracy of the user bits.

A further aspect of the receiver may include that the LDPC decoder is operable to provide at least the second soft information for input to the plurality of channel detectors for iterative processing between the plurality of CDs and the LDPC decoder, each CD processing information for a portion of the codeword, the iterative processing continuing until a determination based at least in part on the second soft information indicates that the outputted user bits meet a confidence threshold.

In a still further aspect, the receiver may further comprise a memory shared among the plurality of CDs and the LDPC decoder. Each of the plurality of CDs may be operable to store the bit decisions and the first soft information in the memory, such as for example, through a memory controller or other memory interface. The LDPC decoder may further operable retrieve the bit decisions and the first soft information, and to store at least the second soft information in the memory from which each of the plurality of CDs can receive a portion of the second soft information for further processing.

In another aspect, a receiver for an intersymbol interference channel comprises one or more channel detectors (CDs) for clocking by a first clock operating at a first frequency, each CD operable to receive information indicative of a portion of a codeword signaled on the channel, and to output first soft information for each bit of that codeword portion. The receiver further comprises a low density parity check (LDPC) code decoder operable to input the first soft information for each bit of the codeword, the LDPC decoder operable to output user bits for the codeword and second soft information concerning reliability of the user bits outputted, the LDPC decoder for clocking by a second clock operating at a second frequency. A ratio of the first frequency and the second frequency is selected such that the one or more CDs is operable to process the information indicative of a codeword in a time approximating a time required by the LDPC decoder to process receive the first soft information and produce the second soft information and the user bits.

Another aspect includes a method of retrieving digital information from an ISI channel, the method comprises receiving information signaled on the ISI channel, where the information indicative of an LDPC codeword comprising a plurality of bits. The method also comprises dividing the channel information into a plurality of portions, such that channel information corresponding to different portions of the codeword is distributed among the plurality of CDs, generating, in each of the channel detectors (CDs), first soft information for each bit of the codeword portion of that CD. The method further comprises inputting the first soft information for the codeword bits into an LDPC decoder, decoding the LDPC codeword in the decoder, and outputting user bits for the codeword and second soft information for the user bits.

Further aspects include a system for transmitting information over an ISI channel. The system comprises a processor operable to produce an LDPC codeword comprising user bits and parity bits generated based on the user data bits and an LDPC generator matrix. The system also comprises a channel encoder operable to input the LDPC codeword into the ISI channel. Such an encoder may also include an interleaver that can alter the order in which codewords and/or codeword portions are sent over the channel. Such systems also comprise a receiver to obtain channel data representative of the LDPC codeword from the ISI channel and output the channel data for reception by a plurality of channel detectors (CDs), each of the CDs operable to produce first soft information for bits of codeword portions represented by channel data received by that CD. The system further comprises an LDPC decoder operable to receive the first soft information, perform LDPC decoding for the generator matrix used during encoding, and output user bits and second soft information indicating reliability of the outputted user bits. The CDs may be operable to receive the second soft information for iterative processing of the channel data, and update the first soft information based on the further processing, the iterative processing continuing until the reliability indicated by the second soft information satisfies a criterion.

Other objects, features, and advantages of the present invention will become apparent upon consideration of the following detailed description and the accompanying drawings, in which like reference designations represent like features throughout the figures.

BRIEF DESCRIPTION OF THE DRAWINGS

For a fuller understanding of aspects and examples disclosed herein, reference is made to the accompanying drawings in the following description.

DETAILED DESCRIPTION

The following description is presented to enable a person of ordinary skill in the art to make and use various aspects of the inventions. Descriptions of specific materials, techniques, and applications are provided only as examples. Various modifications to the examples described herein will be readily apparent to those skilled in the art, and the general principles defined herein may be applied to other examples and applications without departing from the spirit and scope of the invention. The exemplary system configurations, components, exemplary tolerances, design criteria, and the like provided herein are for illustrating various aspects and are not intended to limit the configurations, components, and/or criteria that may be accounted for in particular embodiments.

Channel detectors, e.g., SOVAs have been known to operate serially on received channel information. By contrast, an LDPC decoder must operate on an entire codeword. Aspects disclosed herein relate to the concatenation of an LDPC decoder with soft information detector functionality adapted to approximately match codeword throughput of the LDPC decoder.

LDPC Decoder

Some information concerning LDPC decoders is provided below, and one of ordinary skill also would generally be familiar with additional aspects of LDPC decoders.

Figure 1:
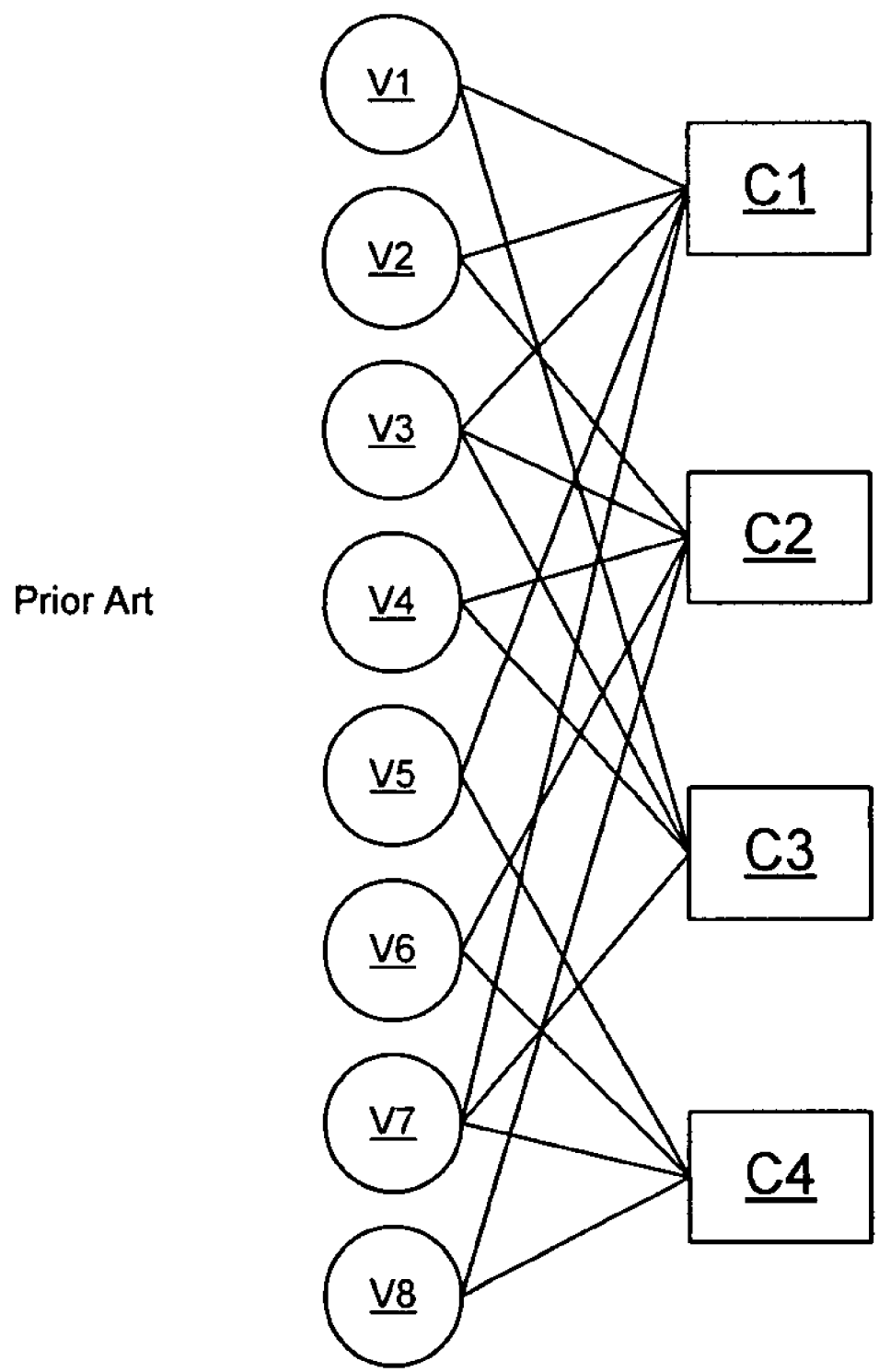
FIG. 1 illustrates a bipartite graph representation of an (8,4) LDPC code.

FIG. 1 illustrates a bipartite graph of an (8,4) LDPC code. The bipartite graph includes variable nodes that each represent one bit of the codeword, and check nodes that represent constraints on the variable nodes represented by the interconnections among the check and variable nodes. As such, a decoder for that LDPC code also can be represented by processing unit(s) (CU) for performing calculations appropriate for the check nodes (CN) as well as processing unit(s) (VU) for performing calculations for the variable nodes, with edges between nodes representing information passed between the nodes, as for example done in the message-passing algorithm.

During LDPC codeword decoding, soft information is exchanged iteratively between the processing units (CU1-4) for the check nodes and the processing units (VU1-8) for the variable nodes. By iterating between variable and check node processing, an LDPC decoder can converge on a correct reconstruction of a transmitted codeword with high confidence.

Figure 2A:
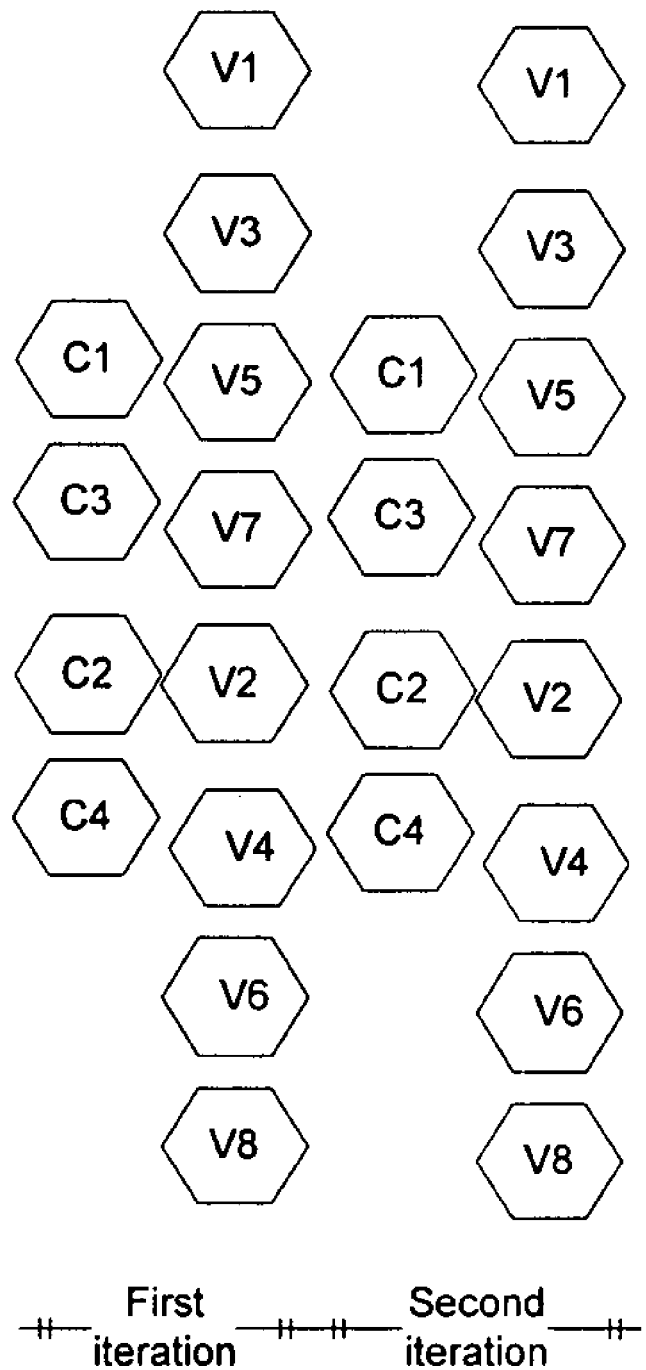
FIGS. 2A-C illustrate processing of channel information by different configurations of LDPC decoders.

LDPC codes can be decoded by a parallel iterative soft decoding algorithm implemented in a paralyzed LDPC decoder. If an LDPC decoder has a CU for each check node in the graph for the code and a VU for each variable node in the graph for the code, then the LDPC decoder is a fully parallel decoder, because it can process an entire codeword without reusing a portion of the decoder. In other words, a fully parallel decoder includes a CU for each check node and a VU for each variable node. As such, all the check nodes and all the variable nodes can be processed simultaneously. FIG. 2A illustrates aspects of processing timing for decoding an LDPC codeword in a fully parallel decoder. As can be seen, all the check nodes can be processed in one time slot while all the variable nodes can be processed the next.

Figure 2B:
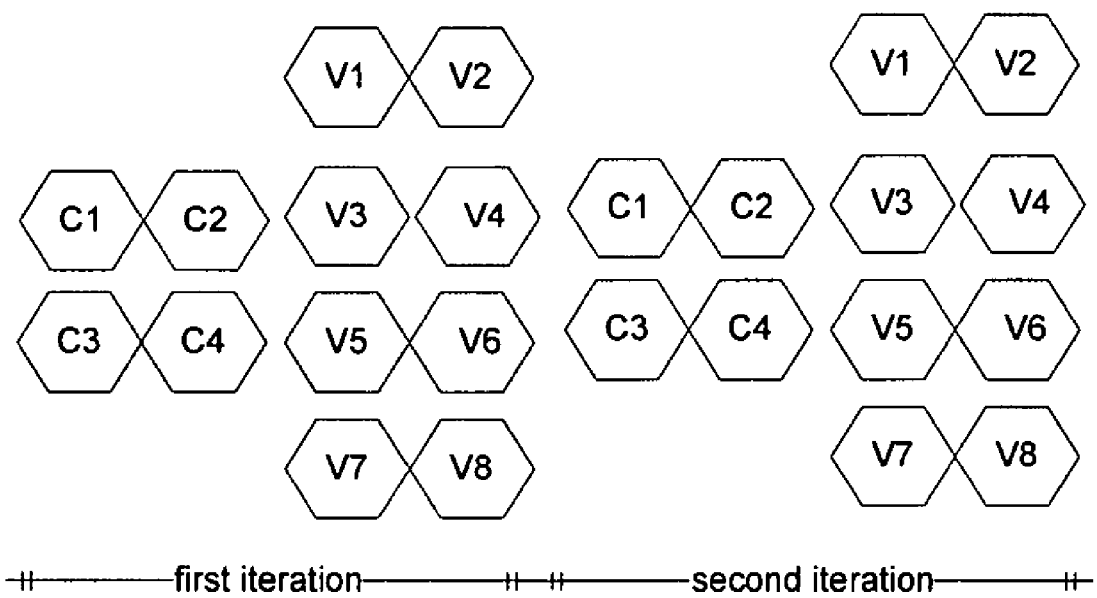

To reduce system size and/or complexity, portions of an LDPC decoder can be reused. For example, a CU and/or VU can be reused during the decoding of a codeword, such that the number of CU and/or VU can be less than a respective number of check nodes and variable nodes in the code. In such a circumstance, portions of the decoder are reused during processing. Such decoders are called partially parallel decoders. A partially parallel LDPC decoder is illustrated in FIG. 2B. Here, it can be seen that C1 and C3 are processed in time slot 1 while C2 and C4 are processed in time slot 2. Similarly, V1, V3, V5 and V7 are processed in time slot 3 while the even V nodes are processed in slot 4. This timing indicates that a decoder performing according to FIG. 2B would include two check units and 4 variable units.

Figure 2C:
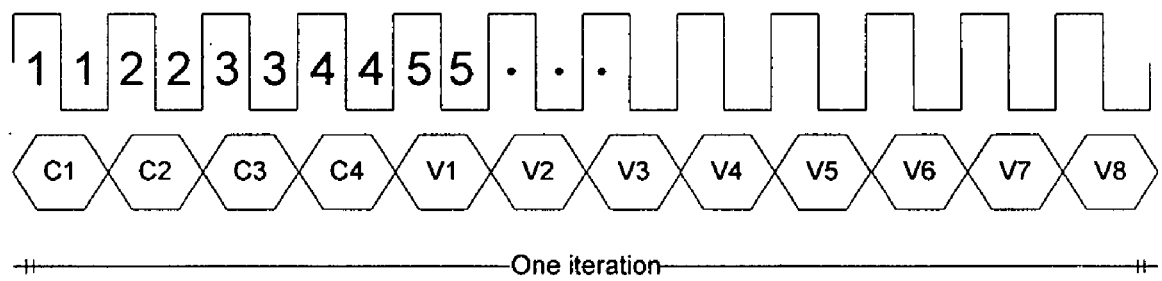

FIG. 2C illustrates an extreme from a fully parallel LDPC decoder—a serial decoder, which has a single CU and a single VU. In a serial decoder, the CU and VU are reused to serially process each check node and variable node of the codeword for each iteration through the decoder. As can be seen, four time slots are required to process the check nodes and eight to process the variable nodes. The above illustrations are comparative and for proportionality, rather than for suggesting absolute clock timing.

Soft Information

LDPC decoders use soft information pertaining to a likelihood that a given input bit is either a one or a zero. Such soft information can take a variety of forms. In some cases, the soft information is expressed as a Log-Likelihood Ratio (LLR) that is denoted, for GF(2) by $$\log\left[P\left(\frac{P_r(c_i = 0|y)}{P_r(c_i = 1|y)}\right)\right].$$

In the particular example of FIG. 3, below, this soft information is generated by a channel detector, and in a more particular example, by a SOft Viterbi Algorithm (SOVA), as described below.

Channel Detectors

As introduced above, an LDPC decoder can operate with a channel detector (e.g., SOVA or BCJR detectors), which provides soft-information inputs to the LDPC decoder. Channel detectors receive output from an equalizer that shapes a signal obtained from a channel into a desired channel response model, for example an EPR4 channel model.

Figure 3:
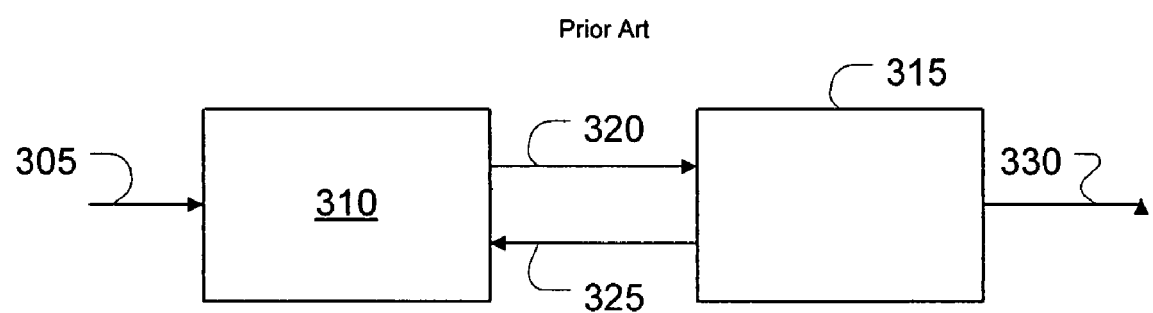
FIG. 3 illustrates a system diagram of a prior art concatenation between a soft information detector and an LDPC decoder for an ISI channel.

FIG. 3 illustrates a block diagram of a concatenation between a channel detector 310 and a LDPC decoder 315 for an ISI channel, as is known in the art. The detector 310 receives ISI channel data 305. Detector 310 also can receive soft information feedback 325 from the LDPC decoder. However, in a first iteration, the soft information from the LDPC decoder 325 is initialized to zero, given that the LDPC decoder has produced no output at that point. Initialized to zero can mean that probabilities of the values of the bits in the channel data are all set to ½—meaning it is equally likely that each bit is a 0 or a 1.

The output of the channel detector 320 is made available to the LDPC decoder 315. The LDPC decoder 315 performs a decoding algorithm for making a decision on user data 330 for output while also generating soft information feedback for the detector to use in a further iteration.

In the particular example of a SOVA, a SOVA channel detector 310 can output decisions on the values of bits in a bitstream detected in the channel data provided to detector 310 as well as information about the reliability of that data. The SOVA algorithm includes a pass of the Viterbi Algorithm (VA) that determines a most likely (ML) path ($\alpha$) and an alternate path ($\beta$) that meets the following criteria: (1) the end point of the traceback must be different from the ML path, and (2) the difference from the ML path must be as small as possible. A difference in metrics between the $\alpha$ and the $\beta$ path can be expressed as an LLR value, and thus, the LLR values conveys reliability information for that bit. The LLR data and the bit decision itself can be conveyed as a signed value, where the sign bit conveys the bit decision and the value conveys the LLR for the bit decision.

SOVA and BCJR detectors are understood in the art as generally working in a serial process. In other words, detector 310 is understood to sequentially generate soft information outputs for a codeword starting from a first bit and proceeding to a last bit of the codeword.

Figure 4:
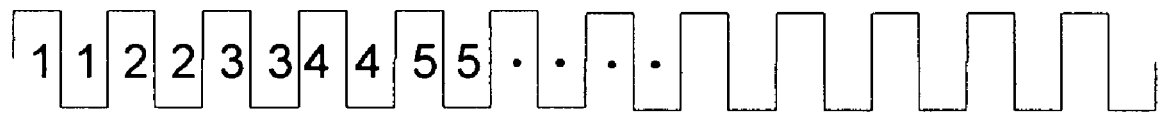
FIG. 4 illustrates processing by the system diagrammed in FIG. 3.

Because a serial channel detector processes each bit of a codeword serially, it is expected to operate at a slower pace than a parallel or a partially-parallel LDPC decoder. In such circumstances, the LDPC decoder would be waiting for the soft information before LDPC decoding begins. FIG. 4 illustrates time slots required for soft information detection and LDPC decoding in the concatenation of soft information detector 310 and LDPC decoder 315. As illustrated, the soft information detector 310 requires a greater number of time slots to complete soft information generation for use by LDPC decoder 315 than LDPC decoder 315 requires for outputting user bits and soft information for iteration with the detector 310. Inventive aspects include balancing codeword throughput between a channel detector and a concatenated LDPC decoder.

Paralyzing Channel Detectors

Figure 5A:
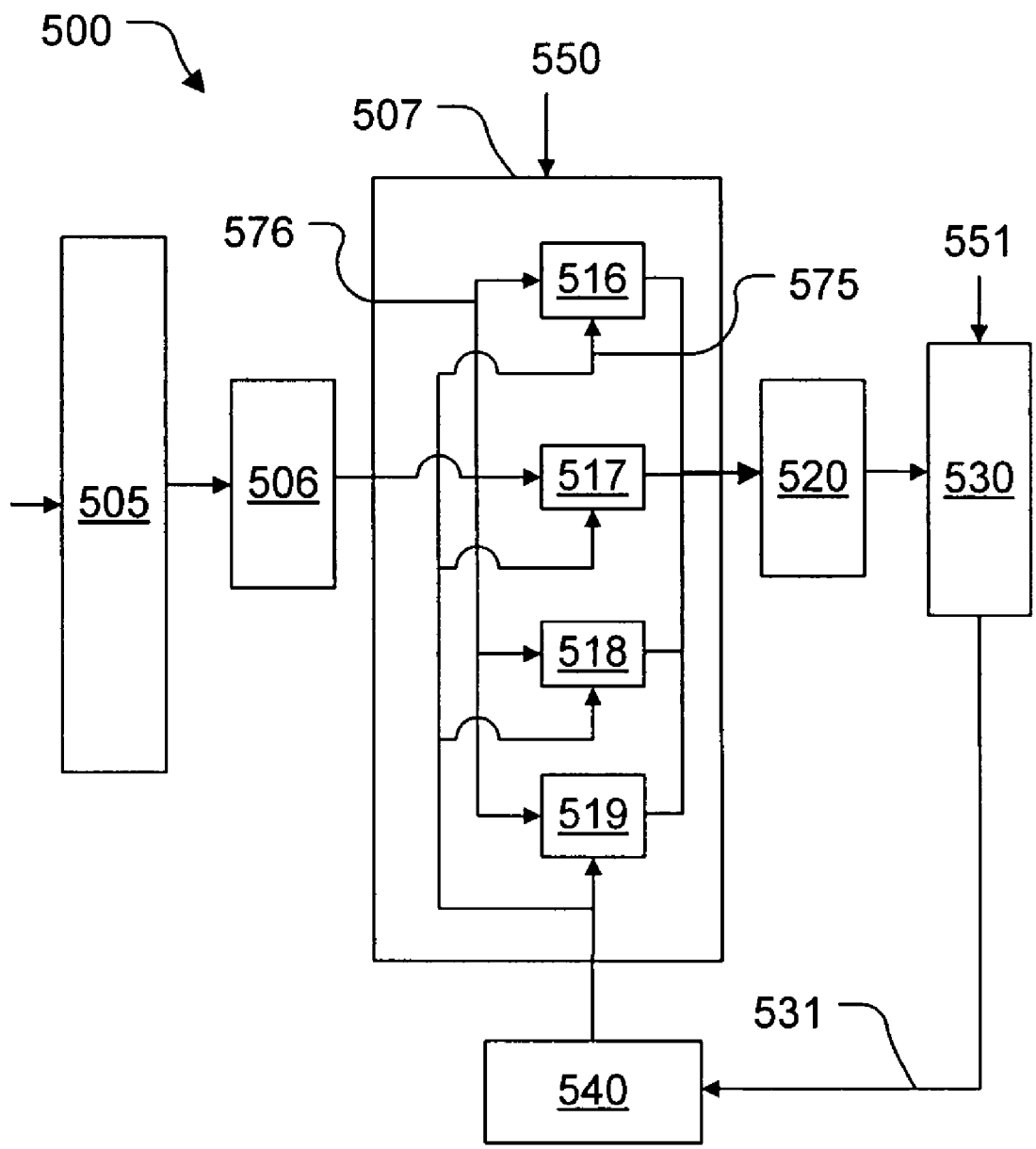
FIG. 5A illustrates aspects of an exemplary receiver comprising a plurality of channel detectors and an LDPC decoder.

FIG. 5A illustrates a system comprising a bank 507 of channel detectors 516-519 coupling with an LDPC decoder 530 that can either parallel process or partially parallel process an LDPC codeword. The bank 507 of detectors receives channel data from a buffer 506. Buffer 506 receives channel data from read functionality 505. The channel data is representative of an LDPC codeword that may be corrupted by errors that occurred at one or more points between transmission and reception of the LDPC codeword. As used throughout this description, transmission and reception respectively comprehend transmission and reception of data across a distance, as well as storage and retrieval of data from a storage medium, or a combination of data storage and transmission.

Read functionality 505 can comprise a read head, filters, an equalizer, and other functional elements as appropriate for the channel at hand, and as known in the art. Each channel detector 516-519 references buffer 506 for a portion of the channel data, which is representative of a portion of the codeword.

Each channel detector 516-519 processes the portion(s) of the codeword provided to it, as though the portion of a codeword were an entire codeword. Therefore, the entire codeword is ready for consumption by the LDPC decoder earlier than if processed in a serial detector.

In a first pass through the bank 507 of channel detectors, each detector 516-519 operates on channel data without benefit of soft information from LDPC decoder 530. This is because on a first iteration of the system 500, the soft information from the decoder 530 would be zeroed, such that it would not affect the initial pass through the detectors 516-519.

On a second and a subsequent pass, soft information 531 output from LDPC decoder 530 can be provided to the bank 507 of channel detectors. System 500 illustrates that soft information 531 is provided by LDPC decoder 530 to a buffer 540. Each detector 516-519 can reference buffer 540 to obtain soft information appropriate for a portion of a codeword to be decoded. Buffer 540 is supplied primarily to allow for greater asynchronicity between the bank 507 of channel detectors and LDPC decoder 530; e.g., to comprehend a situation where LDPC decoder 530 has finished processing a codeword, one or more CDs 516-519 has completed processing of a subsequent codeword portion, but other channel detectors have not yet completed their respective codeword portion.

Likewise soft information output from channel detectors 516-519 is buffered by buffer 520 before it is provided to LDPC decoder 530. For example, such buffering comprehends a situation where one or more of channel detectors 516-519 completes processing of a codeword portion before another.

Other aspects of system 500 include a clock 550 and a clock 551. Clock 550 is provided to the soft information decoder block 507 while clock 551 is provided to LDPC decoder 530. Another optimization that can be used in the system 500, in addition to the splitting of channel data for a codeword among the plurality of CDs 516-519 is clocking each of CDs 516-519 with clock 550 operating at a faster rate than clock 551. For example, clock 550 can be twice the frequency of clock 551, and in such an example, CDs 516-519 can process channel data more rapidly and decrease a time required to process an entire codeword. This aspect can be applied alone and in conjunction with the bank of CDs. In other words, by clocking CDs faster than the LDPC decoder, fewer CDs may need be replicated in a given hardware realization to achieve a desired throughput of codewords.

The depiction of system 500 largely focuses on data flow, and does not separately illustrate, for example, additional connections for addressing buffers 506, 520, or 540. System 500 also does not separately illustrate other logic that may be implemented for indicating readiness of data for consumption. Such signal flow and additional detail can be implemented based on the disclosures provided herein, and depending on implementation choices within the ordinary skill in the art.

Figure 7:
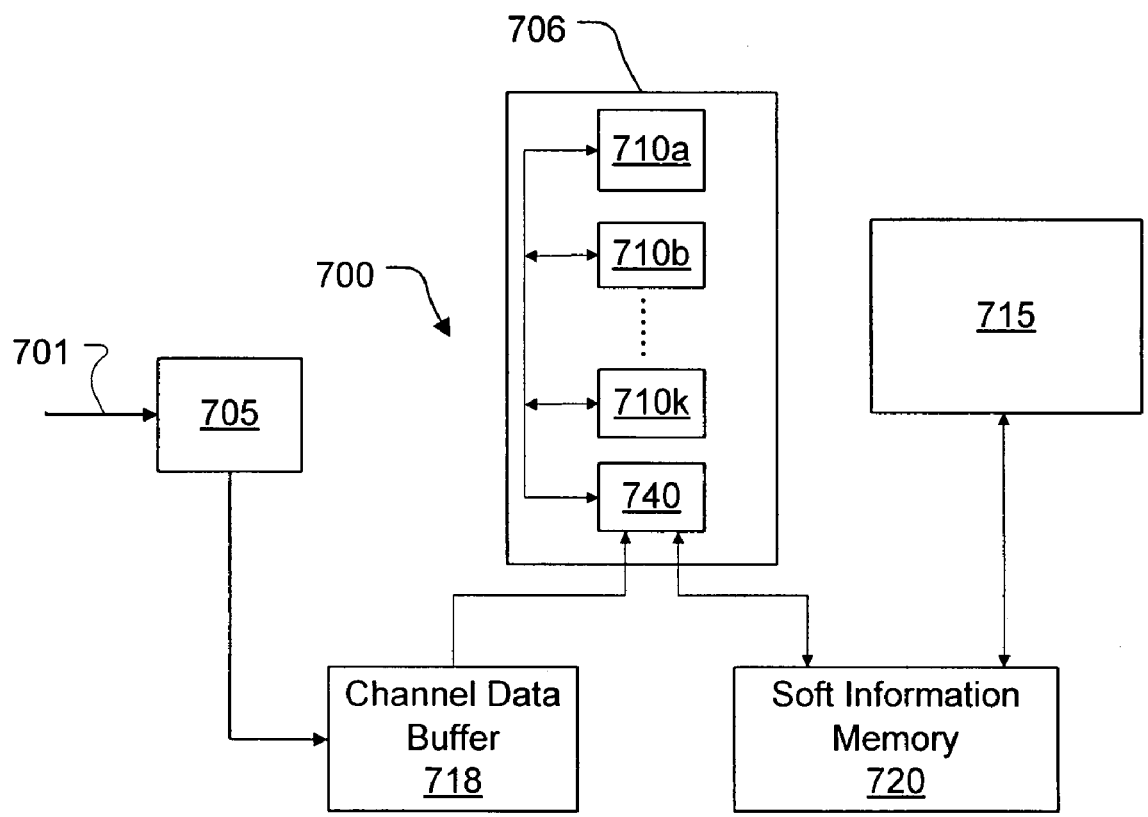
FIG. 7 illustrates another exemplary receiver comprising a plurality of channel detectors and an LDPC decoder.

FIG. 7 illustrates a system 700 also for realizing aspects described above. System 700 includes read functionality 705 for reading and sampling a signal 701 and converting those samples into data that is stored in buffer 718. Channel detector bank 706 comprises a plurality of channel detectors 710a-k and a memory access controller 740 that interfaces the detectors 710a-k with the buffer 718 and a memory 720 that is shared with a LDPC decoder 715.

The channel data stored in buffer 718 can be fetched by controller 740, and distributed among the detectors 710a-k. In present aspects, the controller 740 fetches channel data representative of portions of a codeword, and distributes those portions among detectors 710a-k. Each detectors 710a-k can output bit decisions and first soft information for the bits of the codeword portion provided to it. As with detectors 516-519, bit decisions and first soft information can be conveyed as signed values, where the sign conveys the bit decision and the value conveys an LLR for the confidence of the bit decision. The bit decisions and the first soft information can then be stored in memory 720 by memory controller 740. LDPC decoder 715 can then obtain these bit decisions and their corresponding first information. Once LDPC decoder 715 has bit decisions and soft information for an entire codeword, it can begin processing the codeword. Output of LDPC decoder 715 comprises user bit decisions and second soft information. One or more of the bit decisions and the second soft information can be stored in memory 720. If iteratively processing between detectors 710a-k and LDPC decoder 715, then the second soft information (e.g, LLR information) would be retrieved from memory 720 by controller 740 for distribution among detectors 710a-k. Controller 740 would also coordinate retrieval of channel data from buffer 718 such that soft information retrieved from memory 720 and distributed among detectors 710a-k would correspond to the portion of channel data distributed to each such detector.

Figure 8:
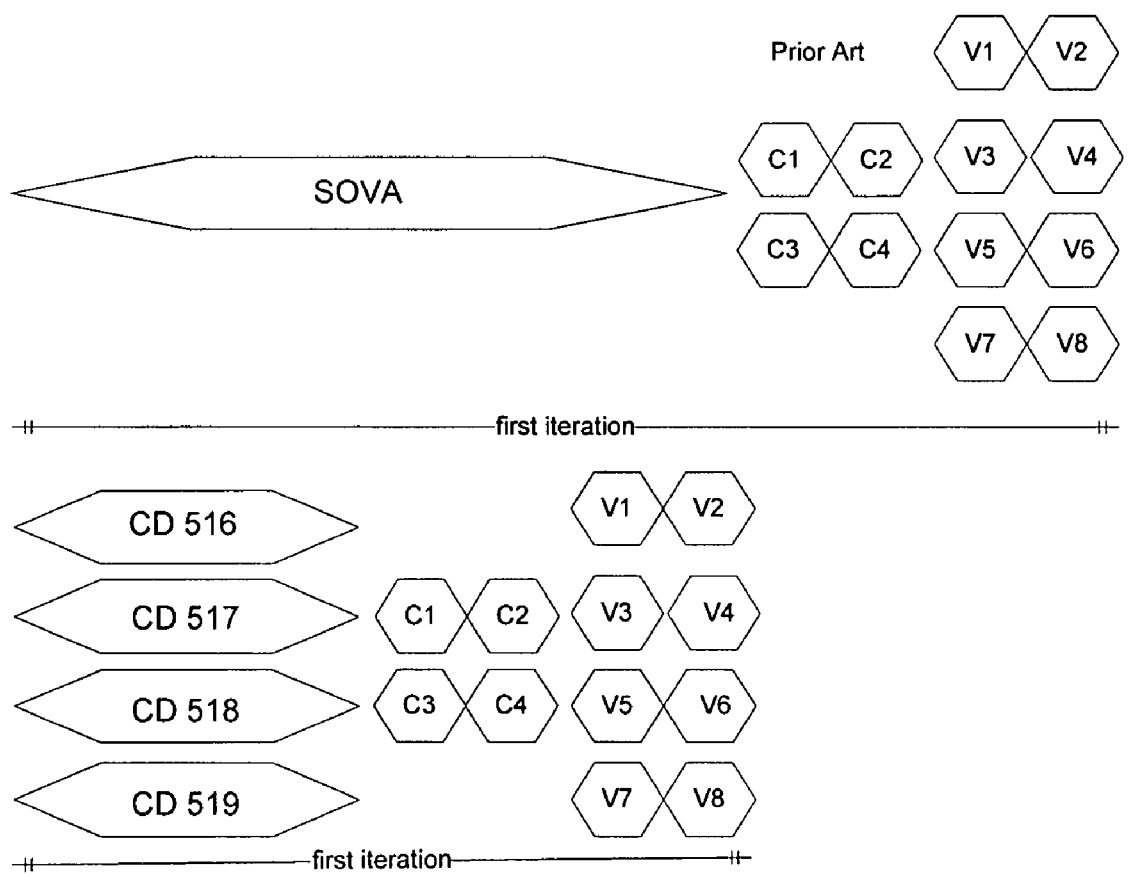
FIG. 8 illustrates aspects of timing for the systems of FIGS. 5 and 7.

FIG. 8 illustrates an example processing time scale difference for the systems 500 and 700 of FIGS. 5 and 7, compared with the system 300, of FIG. 3. As illustrated, a total processing time to complete SOVA activity for one iteration of a codeword is more closely matched to the time required to process the codework in the LDPC decoder, such that an overall time to complete an iteration in the systems 500 and 700 is less than that of system 300.

In an example, an exemplary LDPC code is a (4096, 3840) code, which means that the code contains 4096 variable nodes and 256 check nodes (in the bi-partite graph). A partially parallel LDPC decoder for this code can have 64 VU and 4 CU. Therefore, for one iteration on a codeword according to such an LDPC code, each CU and VU processing unit will be reused 64 times. Since the variable nodes provide information to the check nodes, and vice versa, it takes the LDPC decoder 128 time slots to complete one iteration. A single SOVA detector 310 according to FIG. 3 would require 4096 time slots. For a bank of 32 individual SOVA detectors, it would take that detector bank 128 time slots (128*32=4096).

Methods

A method 600 for implementation in the system 500, described with respect to FIG. 5, incldes receiving channel data indicative of an LDPC codeword. The method also includes dividing the channel data into a plurality of portions, where each portion is input to one of CDs 516-519 for processing by one of the CDs 516-519 (in a partially parallel bank 507, then this inputting would occur over time, as at least some of the CDs would be reused). Each of the CDs 516-519 generates a maximum likelihood bit for each bit of the codeword in the portion provided to that respective CD as well as first soft information for the bit. The first soft information can be expressed as a Log Likelihood Ratio (LLR), between distances of the most likely path and the next most likely path through the Viterbi trellis for that bit. In the particular example of system 500, the dividing and inputting can occur by addressing and retrieval of an appropriate set of locations in buffer 506 by each of the CDs 516-519.

The outputs of the CDs 516-519 are provided as input to the LDPC decoder 530 in step 625. In some cases, the CDs 516-519 can complete processing of the entire codeword simultaneously; for example, where the channel data can be split into 4 portions, and each portion operated on by the CDs such that the entire codeword completes processing in the CDs at about the same time. For long codewords, the CDs would likely process portions of channel data that are smaller than the codeword length divided by the number of CDs, and in such circumstances, some or all of the CDs 516-519 would be reused. While the channel data for the codeword is being processed, the LDPC decoder would not begin processing completed portions of that codeword.

However, the systems disclosed herein and their associated methods reduce such delay compared with prior art concatenations of detectors and LDPC decoders.

Returning to the method 600, the LDPC decoder 530 decodes the codeword to produce the user bits originally encoded by an LDPC encoder (or as best a reconstruction of them as can be presently made, given corruption by channel noise).

The LDPC decoder 530 also generates second soft information for the codeword bits that is provided to the CDs 516-519 for iterative processing. This second soft information can also comprise LLR values for the user bits. In other words, in a first pass, bank 507 extracts bits of a codeword from channel data, and produces first soft information for the extracted bits of the codeword. In subsequent iterations, the bank 507 operates with the channel data and the second soft information provided by LDPC decoder 530. Between iterations between the CDs 516-519 and the LDPC decoder 530, the same CD can process the same portion of a codeword or a different portion.

The method 600 then returns to 620 where each CD produces bit decisions and first soft information for the bits of the portion(s) of the codeword provided to it.

Iterations can continue until the second soft information indicates that the user bits meet a threshold criteria for reliability. For example, the second soft information can be used to determine that the likelihood of an error in the output user bits is below a threshold, such as a bit error rate, a frame error rate, or a number of iterations.

Also, because throughput of bank of channel detectors (507, 706) in exemplary systems and methods is more balanced with throughput of LDPC decoder 530 and 715, such systems and methods also allow greater interleaving of codewords in the system.

For example, when bank 507 finishes with one codeword, each CD 516-519 can input portions of channel data representative of a next codeword while LDPC decoder 530 processes first soft information for the first codeword. Exemplary aspects of such a system are described with respect to FIG. 5B.

Figure 5B:
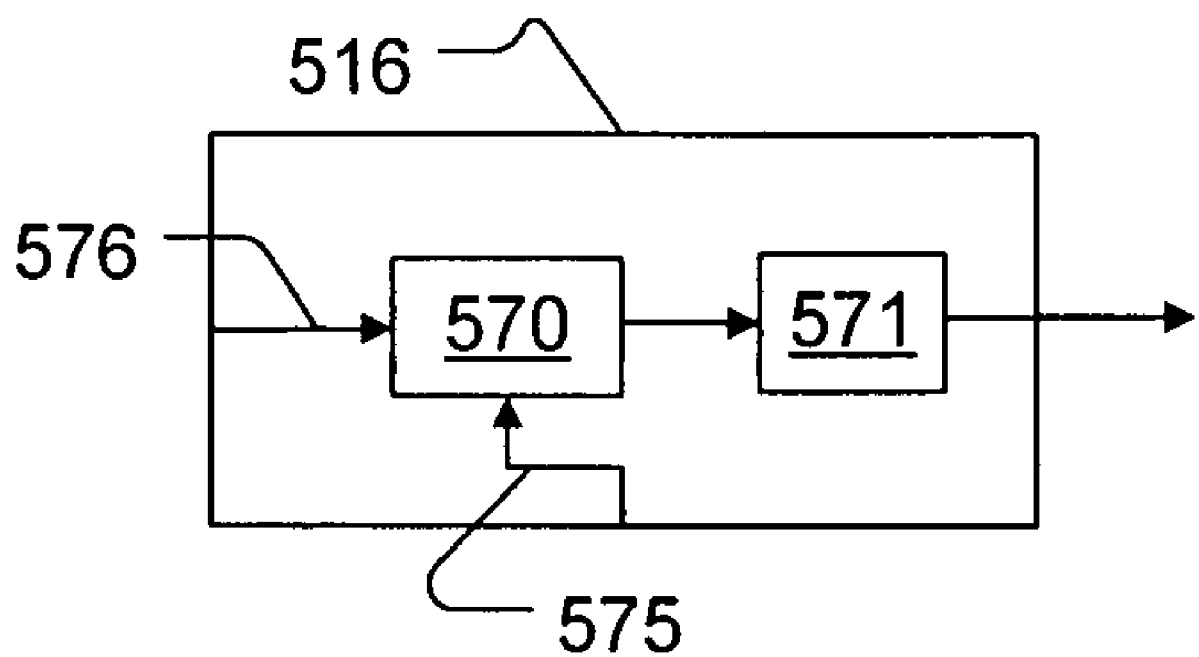
FIG. 5B illustrates an exemplary composition of a channel detector.
Figure 6:
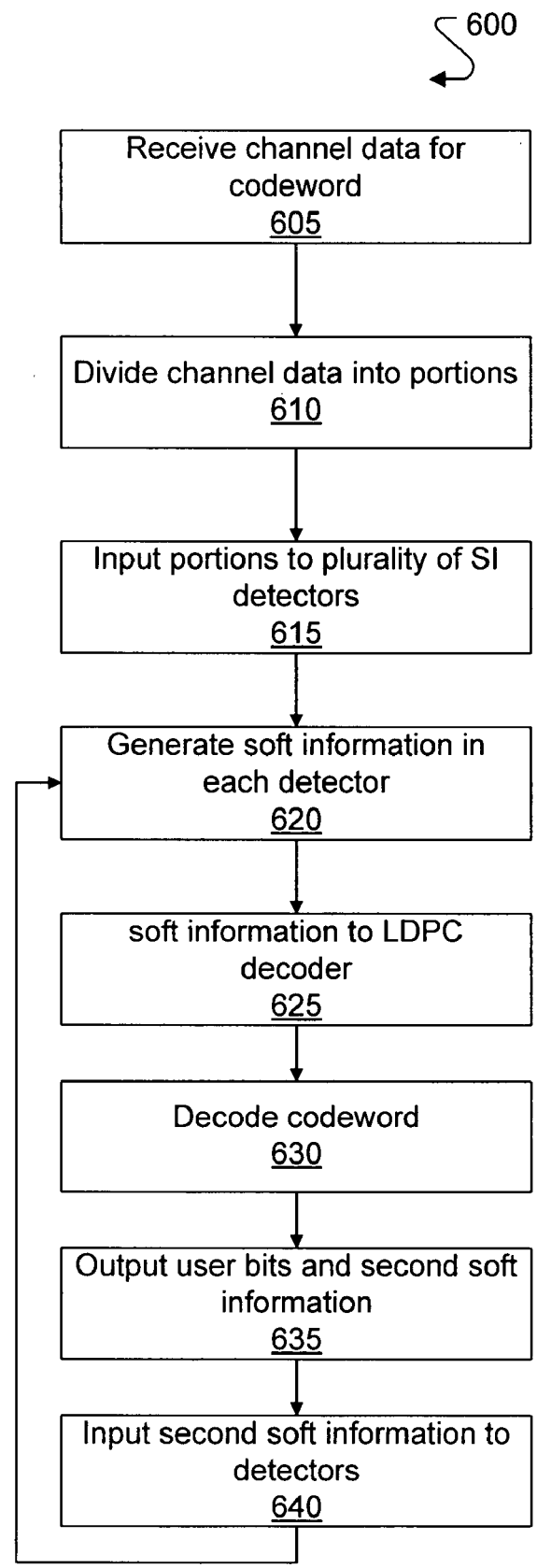
FIG. 6 illustrates a method of processing an LDPC codeword using a plurality of channel detectors and an LDPC decoder.

FIG. 5B illustrates an exemplary composition of channel detector 516 for pipeline processing of channel data representative of multiple codewords within the bank of channel detectors 507 or 706. As illustrated in FIG. 5A, each channel detector 516-519 can receive input from buffer 506, which buffers channel data, as well as from buffer 540, which buffers soft information 531 output from LDPC decoder 530. According to one aspect, pipelining of codeword processing within channel detector 516 can be performed by pipelining processing of previously unprocessed channel data, or by iteratively (i.e., repeatedly) processing channel data using soft information from LDPC decoder 530. In other words, when each channel detector 516-519 completes processing of channel data representative of a portion of a codeword, that channel detector can begin processing of another portion of channel data that can be from that codeword, or for a different codeword. A controller 570 of channel detector 516 can determine whether to obtain channel data for a codeword portion for which there is soft information in buffer 540, or channel data for which no pre-existing soft information exists.

For example, buffers 506 and 540 can be organized and maintained such that soft information for a particular codeword portion, stored in buffer 540 corresponds to channel data stored at a particular location in buffer 506. For example, a pointer can be maintained to a start of channel data for a codeword stored in buffer 506, with portions of the channel data beginning at regularly incrementing offsets of the memory location identified by the pointer. That pointer can be shared with channel detectors 516-519, such that each channel detector can obtain data corresponding to a portion of the codeword. Likewise, a pointer to a memory location of buffer 540 identifying a start of soft information corresponding to the codeword of the buffer 506 pointer can also be maintained and shared with channel detectors 516-519.

Soft information corresponding to the portion of channel data selected, when available, can be retrieved over channel 575 by each channel detector (illustrated here with channel detector 516). These inputs can then be provided to logic 571 of channel detector 516, which generates soft information based on the inputs comprising either channel data or channel data and soft information output from LDPC decoder 530. Compared with receiver 700, channel detectors of receiver 700 could be coordinated more centrally using memory access controller 740 to distribute channel data for codeword portions, and corresponding soft information among detectors 710a-k.

Such pipelining can also be implemented in receiver 700, where memory access controller 740 controls which channel data portions (i.e., channel data corresponding to different codeword portions) are distributed to which of channel detectors 710a-k. Memory access controller 740 can also coordinate distribution of soft information corresponding to the channel data portions from soft information 720 to channel detectors 710a-k.

Delay in SOVA

Since SOVA is based on the Viterbi Algorithm, a SOVA detector introduces a delay through the use of the Viterbi decoding trellis, while a BCJR detector would not have this effect. Although not required, usage of either SOVA or BCJR detectors according to aspects described herein may also include causing each codeword portion (each codeword portion fed to each detector in the bank of the detectors 516-519) to start and end in a zero state. A practical way to enforce this condition is that the data entering each detector should begin and end with a number zeros determined by the number of registers used for the type of ISI channel used. For example, an EPR4 channel should have 3 zeros between each codeword portion fed into a particular detector. In such aspects, a code rate penalty is introduced by the addition of extra zeros in the user data. For example, a bank of 32 SOVA detectors for an EPR4 implementation and an (4096, 3840) LDPC code would be 3/128=2.34%.

Interleaving

Embodiments described herein can also accommodate various interleaving strategies. For example, interleaving may be done on portions of a codeword, and among codewords. Interleaving may used to store data expected to be used at about the same time in memory areas that can be accessed at the same time.

Figure 9:
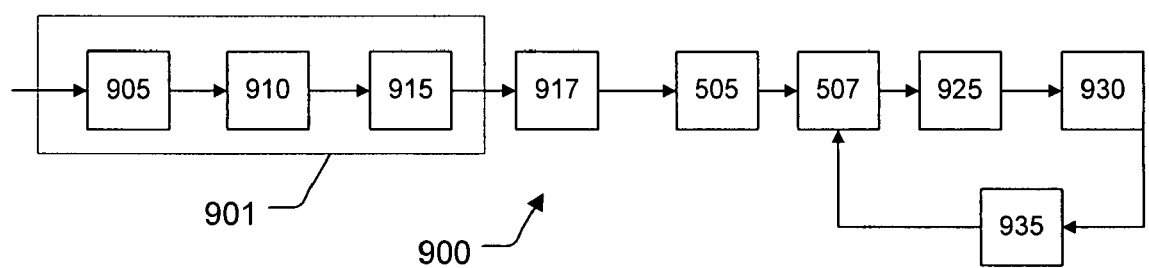
FIG. 9 illustrates aspects of a system comprising an LDPC encoder, a plurality of channel detectors, and an LDPC decoder.

FIG. 9 illustrates a system 900 comprising a bank of channel detectors 507, as illustrated in and described with respect to FIG. 5. System 900 can also comprise portions of decoder 700, such as the bank of channel detectors 706 as well as memory 720. System 900 comprises an encoder 901 which in turn comprises string assembler 905 that receives user bit sequences for ultimate transmission/recording on the channel. String assembler 905 divides the user bit sequences into lengths appropriate for a particular LDPC code. In other words, if the LDPC code being used produces codewords of a length k from user bit sequences of length j, then string assembler 905 provides user bit sequences of length j, subject to other processing that string assembler 905 may do, as described below.

String assembler 905 may perform functions including providing zeroes at specified points within received user bit sequences, such that after final processing of a user bit sequence comprising a codeword, the zeros separate portions of the codeword. In other words, string assembler 905 may interleave the zeros such that detectors 516-519 or 710a-k may each start at zero state trellises between processing codeword portions.

String assembler 905 outputs the assembled and potentially interleaved strings of user bits to an LDPC encoder 910. LDPC encoder produces codewords based on a particular LDPC code. The codeword portions can then be interleaved by interleaver 915. The codeword portions are then transmitted/recorded on channel 917. String assembler 905, LDPC encoder 910, and interleaver 915 can be implemented in one or more of a variety of processors, including software configured processors, as well as ASICs and FPGAs.

The codeword portions are received/read by read functionality 505, and provided to the bank of SOVA detectors 507, bank 507 operates as described with respect to FIG. 5, such that each detector 516-519 produces bit decisions and soft information for a portion of the codeword. These bit decisions and soft information are then deinterleaved by deinterleaver 925 such that the codeword is complete and in proper order for submissions to LDPC decoder 930. LDPC decoder 930 operates on the codeword and produces user bit output and second soft information for the codeword. These user bits and second soft information can be provided back to SOVA detector bank 507, by providing them to interleaver 935, which then provides them to SOVA bank 507.

Figure 10:
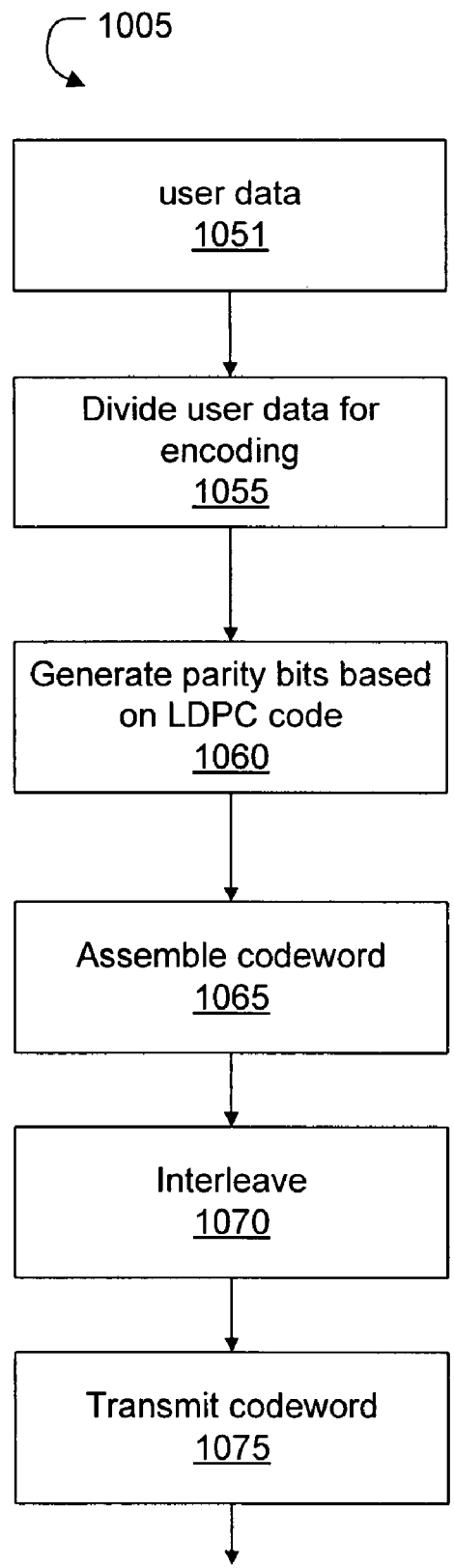
FIG. 10 illustrates a method performed at a transmitter with an LDPC encoder for producing LDPC codewords for decoding with receivers according to FIGS. 5 and 7.

FIG. 10 illustrates steps at encoder 901 of system 900 (FIG. 9). String assembler 905 can receive user data (1051) comprising bit sequences for transmission/recording on the channel. String assembler 905 divides (1055) the user bit sequences into lengths appropriate for a particular LDPC code. In other words, if the LDPC code being used produces codewords of a length k from user bit sequences of length j, then string assembler 905 provides user bit sequences of length j, subject to other processing that may occur within string assembler 905, as described with respect to FIG. 9.

String assembler 905 outputs assembled and potentially interleaved strings of user bits to LDPC encoder 910. LDPC encoder produces parity bits (1060) and assembles codewords (1065) comprising the generated parity bits. The codeword portions can then be interleaved (1070) by interleaver 915. The codeword portions are then transmitted/recorded (1075) on channel 917.

Each of the foregoing separately identified functional blocks and other examples of implementation can be implemented separately or with other functions in one or more physically separate items of hardware, including programmed general purpose computers, ASICs, and FPGAs. For example, channel detectors 516-519 can be implemented on an FPGA, and can interface with one or more separate memory elements. In some cases, memory elements can at least be partially incorporated on the FPGA; for example, a cache on the FPGA can hold portions of data destined for each channel detector. Such implementation examples hold as well for the receiver system 700. As the amount of functionality that can be provided in a physically realizable semiconductor processing element continues to increase, an implementation of the aspects described above can continue to evolve, as one of ordinary skill would understand from these disclosures.

The foregoing description of the exemplary embodiments of the invention has been presented for the purposes of illustration and description. It is not intended to be exhaustive or to limit the invention to the precise form disclosed. Additionally, particular examples have been discussed and how these examples are thought to address certain disadvantages in related art. This discussion is not meant, however, to restrict the various examples to methods and/or systems that actually address or solve the disadvantages. A latitude of modification, various changes, and substitutions are intended in the present invention. In some instances, features of the invention can be employed without a corresponding use of other features as set forth. Many modifications and variations are possible in light of the above teachings, without departing from the scope of the invention. It is intended that the scope of the invention be limited not with this detailed description, but rather by the claims appended hereto.

I claim:

1. A receiver for an intersymbol interference (ISI) channel, comprising:
a plurality of channel detectors (CDs) operable to receive portions of a codeword signaled on the ISI channel, and to output bit decisions and first soft information; and
a low density parity check (LDPC) decoder operable to receive the bit decisions and the first soft information from the plurality of CDs and to output user bits for the codeword and second soft information that indicates the accuracy of the user bits.

2. The receiver of claim 1, where the LDPC decoder is operable to provide the second soft information for input to the plurality of channel detectors for iterative processing between the plurality of CDs and the LDPC decoder, where the iterative processing begins in the plurality of CDs without intervening further iterations using the second soft information in the LDPC decoder, where a CD processes information for a portion of the codeword, where the iterative processing continues until the second soft information indicate that the outputted user bits meet a confidence threshold and where a CD in the plurality of CDs receives a portion of the codeword that is less than the whole codeword.

3. The decoder of claim 1, further comprising a memory shared among the plurality of CDs and the LDPC decoder, where the plurality of CDs are operable to store the bit decisions and the first soft information in the memory, and where the LDPC decoder is further operable to retrieve the bit decisions and the first soft information from the memory, and
where the LDPC decoder is further operable to store at least the second soft information in the memory from which the plurality of CDs receive a portion of the second soft information for processing.

4. The decoder of claim 1, further comprising a first clock operable at a first frequency for provision to the plurality of CDs and a second clock operable at a lower frequency than the first frequency for provision to the LDPC decoder.

5. The decoder of claim 1, comprising
a read head for reading the channel information from a recording medium; and
a divider operable to divide the codeword into a plurality of portions for the plurality of CDs.

6. The decoder of claim 1, where the confidence threshold is specified as a number of iterations.

7. The decoder of claim 1, where the confidence threshold is specified as a number of iterations or as an error rate below a specified amount, where if the error is below the specified amount, remaining iterations are not completed.

8. The decoder of claim 7, where the error rate is specified as a frame error rate.

9. The decoder of claim 7, where the error rate is specified as a bit error rate.

10. The decoder of claim 1, where the first soft information includes Log Likelihood Ratios (LLRs) indicative of a likelihood that a user bit is either a 0 or a 1, and where the LLR is conveyed within a signed value that also conveys a corresponding bit decision.

11. The decoder of claim 1, where the plurality of CDs are arranged in parallel to receive different portions of the codeword simultaneously.

12. A decoder for an intersymbol interference channel, comprising:
at least two channel detectors (CDs), where a CD is operable to receive information that indicates a portion of a codeword signaled on the channel, and to output first soft information for the portion of the codeword; and
a low density parity check (LDPC) decoder operable to input the first soft information for the codeword and to output user bits for the codeword and second soft information indicating reliability of the user bits outputted, and
where the at least two CDs are operable to process the codeword in a time approximating a time required by the LDPC decoder to process the first soft information and produce the second soft information and the user bits.

13. The decoder of claim 12, comprising a memory shared between the at least two CDs and the LDPC decoder, where the at least two CDs are operable to store the first soft information in the memory and the LDPC decoder is operable to retrieve the first soft information from the memory; and
where the LDPC decoder is operable to store at least the second soft information in the memory from which the CDs are operable to access the second soft information for processing, and where the CDs operate in parallel on different portions of the codeword.

14. A method of retrieving digital information from an intersymbol interference (ISI) channel, comprising:
receiving information signaled on the ISI channel, where the information is indicative of a low density parity check (LDPC) codeword that includes a plurality of bits;
dividing the channel information into a plurality of portions and distributing different portions of the plurality of portions in parallel to the plurality of channel detectors (CDs);
generating, in the CDs, first soft information for the plurality of portions;
inputting the first soft information into an LDPC decoder; and
decoding the LDPC codeword in the LDPC decoder, and outputting user bits for the codeword and second soft information for the user bits.

15. The method of claim 14, comprising, at a channel encoder, interleaving, into a string, user bits for transmission on the ISI channel with a plurality of zero bits determined by multiplying a number of CDs at the decoder by a number of registers in a state machine model of the ISI channel, where the plurality of zero bits are distributed at intervals through the codeword;

generating parity bits for an output of an interleaver based on an LDPC code generator matrix;

assembling the codeword from the user bits interleaved with the plurality of zero bits and the generated parity bits; and transmitting the codeword on a channel for reception at the LDPC decoder.

16. The method of claim 14, where the CDs are clocked at a higher frequency than the LDPC decoder.

17. The method of claim 14, where the plurality of portions is equal to the number of the CDs.

18. The method of claim 14, where the plurality of portions is more than the number of the CDs.

19. A system for transmitting information over an intersymbol interference (ISI) channel, comprising:

a processor operable to produce a low density parity check (LDPC) codeword comprising user bits and parity bits generated based on the user bits and an LDPC generator matrix;

a channel encoder operable to input the LDPC codeword into the ISI channel;

a receiver to obtain channel data representative of the LDPC codeword from the ISI channel and output the channel data for reception by a plurality of channel detectors (CDs), where the CDs are operable to produce first soft information for bits represented by portions of the channel data; and an LDPC decoder operable to receive the first soft information, and to perform LDPC decoding for the generator matrix used during encoding, and output user bits and second soft information indicating reliability of the outputted user bits, where the CDs are operable to receive the second soft information for iterative processing of the channel data, and update the first soft information based on the further processing, the iterative processing continuing until the reliability indicated by the second soft information satisfies a criterion.

20. The system of claim 19, comprising a memory accessible by the plurality of channel detectors and the LDPC decoder, the memory for storing at least the first soft information and the second soft information, where the LDPC decoder accesses the first soft information from the memory, and where the plurality of CDs access the second soft information from the memory.

21. The system of claim 19, comprising an interleaver operable to pad a string comprising the user bits and the parity bits with a number of zero bits determined based on a number of the channel detectors (CDs) present at a receiver and a number of states in a model of the ISI channel, where the interleaver is operable to pad the zero bits between sections comprising portions of user bits and parity bits, the number of sections is determined based on the number of CDs in the receiver, and where the plurality of CDs operate in parallel on different portions of the codeword.

* * * * *